US012198583B1

(12) United States Patent
Tseng et al.

(10) Patent No.: US 12,198,583 B1
(45) Date of Patent: Jan. 14, 2025

(54) DRIVER CIRCUIT AND DISPLAY DEVICE

(71) Applicant: NOVATEK Microelectronics Corp., Hsinchu (TW)

(72) Inventors: Ching-Wu Tseng, New Taipei (TW); Wei-Lun Shih, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/349,973

(22) Filed: Jul. 11, 2023

(51) Int. Cl.
*G09G 3/00* (2006.01)
*G09G 3/3233* (2016.01)

(52) U.S. Cl.
CPC ........... *G09G 3/006* (2013.01); *G09G 3/3233* (2013.01); *G09G 2300/0819* (2013.01); *G09G 2300/0842* (2013.01); *G09G 2310/08* (2013.01); *G09G 2320/02* (2013.01); *G09G 2330/08* (2013.01); *G09G 2330/12* (2013.01)

(58) Field of Classification Search
CPC .... G09G 3/006; G09G 3/3233; G09G 3/0819; G09G 2300/0842; G09G 2310/08; G09G 2320/02; G09G 2330/08; G09G 2330/12
See application file for complete search history.

(56) References Cited

U.S. PATENT DOCUMENTS 7,123,247 B2 * 10/2006 Morita ................. G09G 3/3611 345/98
2013/0021306 A1 * 1/2013 Kuo ......................... G09G 3/20 345/204
2013/0036335 A1 * 2/2013 Kim ....................... G09G 3/006 714/704

* cited by examiner

*Primary Examiner* — Stephen G Sherman
(74) *Attorney, Agent, or Firm* — CKC & Partners Co., LLC

(57) ABSTRACT

A driver circuit is coupled to a control circuit which is configured to control a plurality of pixels. The driver circuit includes a detector circuit and an outputting circuit. The detector circuit is configured to detect whether an error occurs or not. The outputting circuit is configured to output an enable signal to the control circuit. When the error occurs, the enable signal changes from a first level to a second level such that the control circuit stops outputting a plurality of control signals to the plurality of pixels.

11 Claims, 6 Drawing Sheets

500

DRIVER CIRCUIT AND DISPLAY DEVICE

BACKGROUND

Technical Field

The present disclosure relates to display technology. More particularly, the present disclosure relates to a driver circuit and a display device.

Description of Related Art

With developments of technology, display devices are applied to various electronic devices. In some related approaches, when an error occurs, a decoder in a display device cannot restore correct data, causing the display device to display a snowflake image (noise image). How to solve the problem is an important issue in this field.

SUMMARY

Some aspects of the present disclosure are to provide a driver circuit. The driver circuit is coupled to a control circuit which is configured to control a plurality of pixels. The driver circuit includes a detector circuit and an outputting circuit. The detector circuit is configured to detect whether an error occurs or not. The outputting circuit is configured to output an enable signal to the control circuit. When the error occurs, the enable signal changes from a first level to a second level such that the control circuit stops outputting a plurality of control signals to the plurality of pixels.

Some aspects of the present disclosure are to provide a display device. The display device includes an active area, a control circuit, and a driver circuit. The active area includes a plurality of pixels. The control circuit is configured to control the plurality of pixels. The driver circuit is configured to detect whether an error occurs or not and output an enable signal to the control circuit. When the error occurs, the enable signal changes from a first level to a second level such that the control circuit stops outputting a plurality of control signals to the plurality of pixels.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
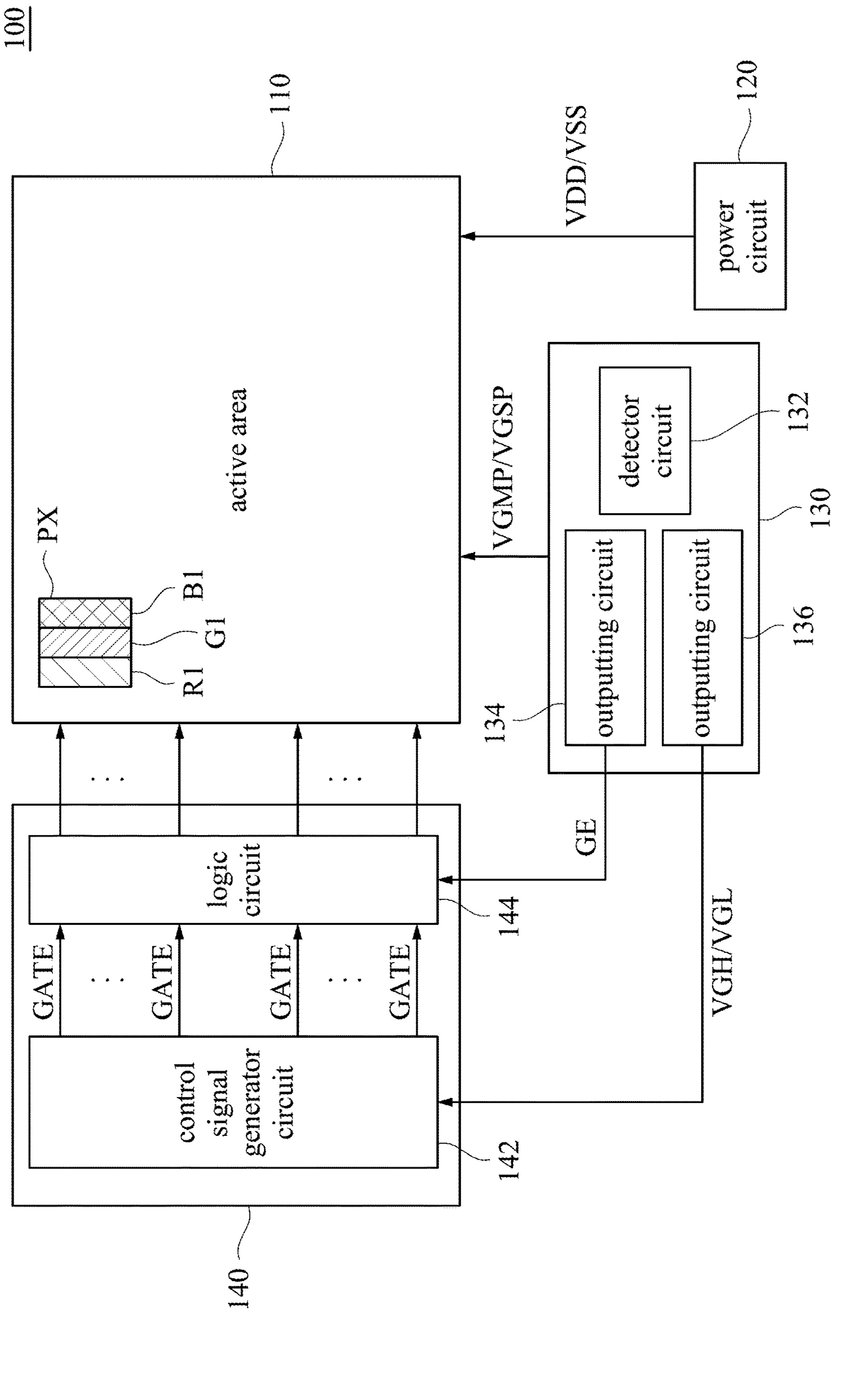
FIG. 1 is a schematic diagram illustrating a display device according to some embodiments of the present disclosure.

Reference is made to FIG. 1. FIG. 1 is a schematic diagram illustrating a display device 100 according to some embodiments of the present disclosure.

In some embodiments, the display device 100 includes an organic light-emitting diode display panel, but the present disclosure is not limited thereto.

As illustrated in FIG. 1, the display device 100 includes an active area 110, a power circuit 120, a driver circuit 130, and a control circuit 140. The active area 110 is coupled to the power circuit 120, the driver circuit 130, and the control circuit 140. The driver circuit 130 is coupled to the control circuit 140.

The active area 110 is configured to display an image. The image can be a dynamic image. In practical applications, the active area 110 includes a plurality of pixels PX. For simplicity, only one pixel PX is illustrated in FIG. 1, and other pixels are omitted. One pixel PX includes a red sub-pixel R1, a green sub-pixel G1, and a blue sub-pixel B1.

The power circuit 120 is configured to provide a power voltage VDD and a power voltage VSS to the active area 110. The sub-pixels in the active area 110 can operate based on the power voltage VDD and a power voltage VSS.

The driver circuit 130 is configured to provide a voltage VGMP and a voltage VGSP to the pixels PX in the active area 110. As illustrated in FIG. 1, the driver circuit 130 includes a detector circuit 132, an outputting circuit 134, and an outputting circuit 136. In practical applications, when an electrostatic discharge (ESD) event or other abnormal event occurs, a Mobile Industry Processor Interface (MIPI) error, a Cyclic Redundancy Check (CRC) error, a loss synchronization error, a bit error, or other errors may occur. The detector circuit 132 is configured to detect whether an error occurs or not. The outputting circuit 134 is configured to output an enable signal GE to the control circuit 140 according to the detection result of the detector circuit 132. The outputting circuit 136 is configured to output a voltage VGH and a voltage VGL to the control circuit 140.

The control circuit 140 is configured to control the pixels PX in the active area 110. As illustrated in FIG. 1, the control circuit 140 includes a control signal generator circuit 142 and a logic circuit 144. The control signal generator circuit 142 is coupled to the logic circuit 144, and the logic circuit 144 is coupled to the pixels PX in the active area 110. The control signal generator circuit 142 is configured to receive the voltage VGH and the voltage VGL from the outputting circuit 136 and generate control signals GATE according to the voltage VGH and the voltage VGL. The logic circuit 144 is configured to receive the control signals GATE from the control signal generator circuit 142 and receive the enable signal GE from the outputting circuit 134. The logic circuit 144 is further configured to output the control signals GATE to the pixels PX in the active area 110 according to the enable signal GE. In some embodiments, the control circuit 140 can be implemented by the Gate-on-Array (GOA) technology.

Then, the pixels PX in the active area 110 can be controlled to display corresponding image according to inputted image data, the power voltages VDD and VSS, the voltages VGMP and VGSP, and the control signals GATE.

Figure 2:
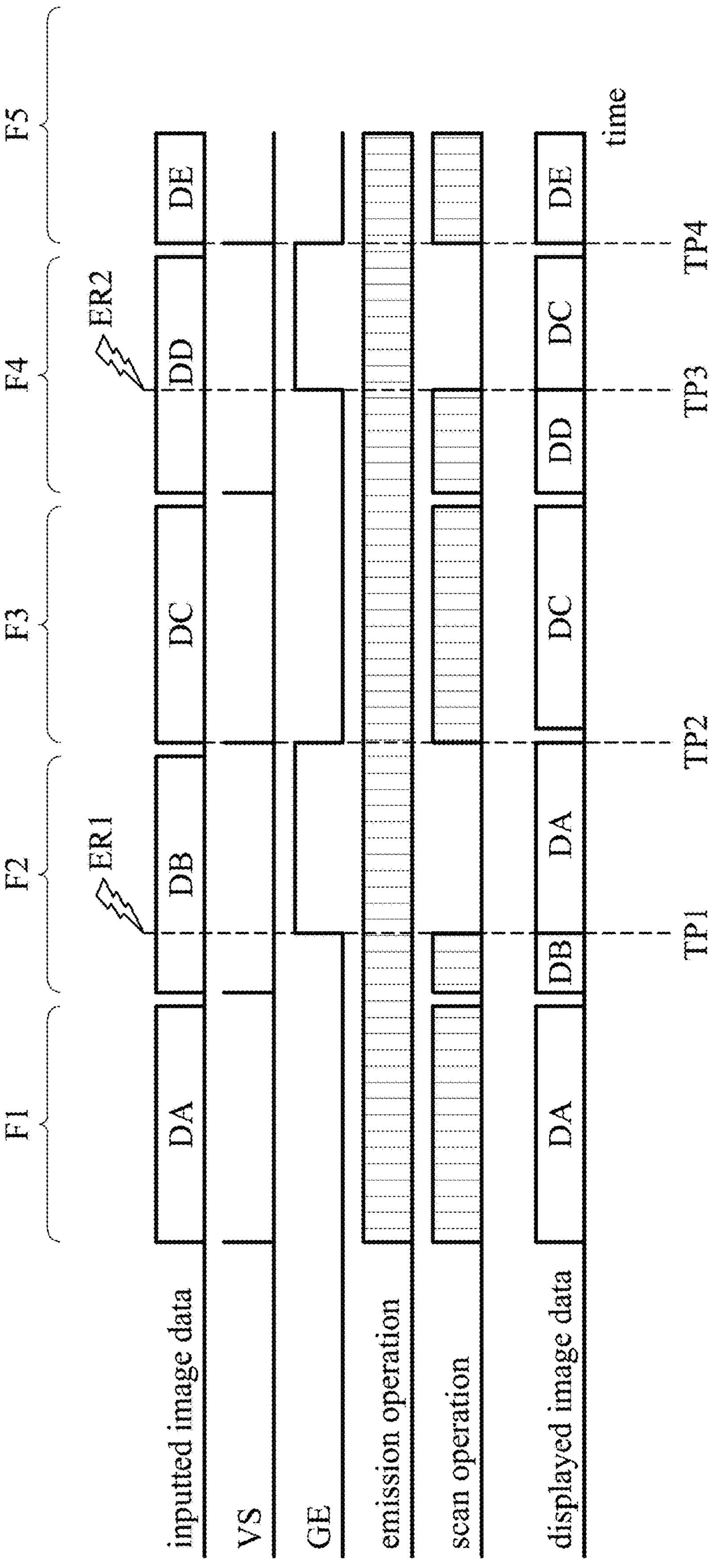
FIG. 2 is an operation diagram of the display device in FIG. 1 according to some embodiments of the present disclosure.

References are made to FIG. 1 and FIG. 2. FIG. 2 is an operation diagram of the display device 100 in FIG. 1 according to some embodiments of the present disclosure.

As illustrated in FIG. 2, it is assumed that one image has frames F1-F5 sequentially. Inputted image data of the frames F1-F5 are image data DA, image data DB, image data DC, image data DD, and image data DE respectively. The image data DA, the image data DB, the image data DC, the image data DD, and the image data DE can be transmitted from the driver circuit 130 to the pixels PX in the active area 110. A vertical synchronization signal VS is an internal signal in the driver circuit 130 and is configured to indicate a start of one frame. In this example, an error ER1 occurs at an error timing point TP1 in the frame F2 (e.g., (N)th frame). The enable signal GE has a low level (e.g., logic value 0) in the frame F1 and changes from the low level to a high level (e.g., logic value 1) at the error timing point TP1 in the frame F2. The low level is lower than the high level. Then, the enable signal GE changes from the high level to the low level at a start timing point TP2 of the next frame F3 (e.g., (N+1)th frame). Another error ER2 occurs at an error timing point TP3 in the frame F4. The enable signal GE has the low level in the frame F3 and changes from the low level to the high level at the error timing point TP3 in the frame F4. Then, the enable signal GE changes from the high level to the low level at a start timing point TP4 of the next frame F5. No matter whether the errors ER1-ER2 occurs or not, signals related to emission operate normally. However, when the enable signal GE has the low level, corresponding pixels PX are scanned normally. When the enable signal GE has the high level, corresponding pixels PX are not scanned normally. The details about the scan operation are described in following paragraphs with reference to FIG. 3.

Figure 3:
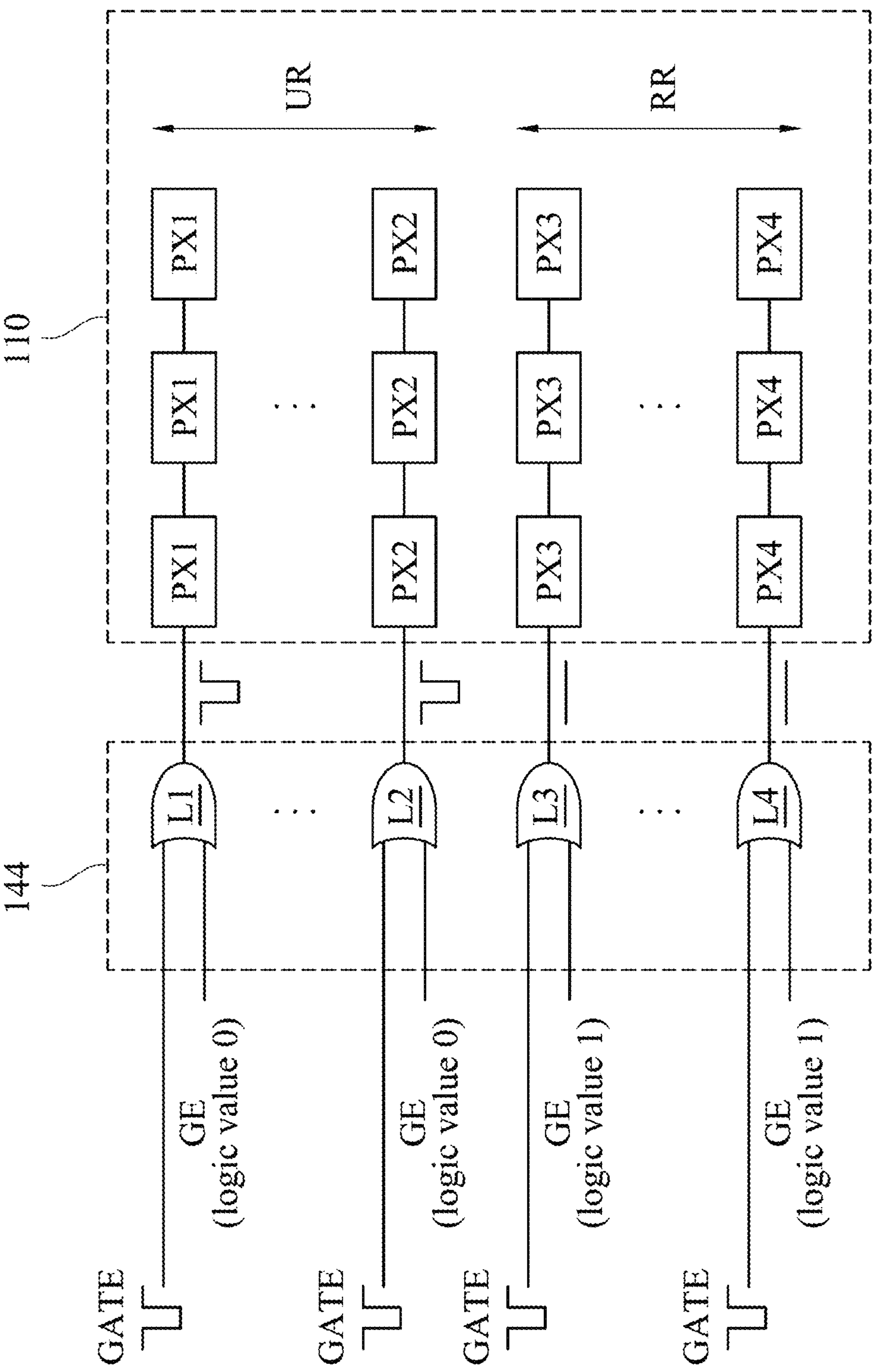
FIG. 3 is a schematic diagram illustrating the logic circuit and the active area in FIG. 1 according to some embodiments of the present disclosure.

Reference is made to FIG. 3. FIG. 3 is a schematic diagram illustrating the logic circuit 144 and the active area 110 in FIG. 1 according to some embodiments of the present disclosure.

As illustrated in FIG. 3, the logic circuit 144 includes logic gates L1-L4. Each of the logic gates L1-L4 has a first input terminal, a second input terminal, and an output terminal. The first input terminals of the logic gates L1-L4 are configured to receive the control signals GATE from the control signal generator circuit 142 in FIG. 1. The second input terminals of the logic gates L1-L4 are configured to receive the enable signal GE from the outputting circuit 134 in FIG. 1. Each of the logic gates L1-L4 is configured to perform a logic operation on the control signal GATE received at its first input terminal and the enable signal GE received at its second input terminal. In this example, the logic gates L1-L4 are implemented by OR gates, so the aforementioned logic operation is an OR operation. The output terminals of the logic gates L1-L4 are configured to output the OR operation results of the logic gates L1-L4 to the pixels PX1-PX4 respectively.

It is noted that the implementations of the logic gates L1-L4 in FIG. 3 are merely illustration, and the present disclosure is not limited thereto. Other suitable implementations of the logic gates L1-L4 are within the contemplated scopes of the present disclosure.

References are made to FIG. 2 and FIG. 3. In general, the pixels PX1-PX4 are scanned row by row. In other words, the pixels PX1, the pixels PX2, the pixels PX3, and the pixels PX4 are scanned sequentially.

Before the error timing point TP1, the enable signal GE has the logic value 0. Thus, the logic gates L1-L2 perform the OR operations according to the enable signal GE with the logic value 0. Taking the logic gate L1 as an example, when the enable signal GE has the logic value 0, the operation result at the output terminal of the logic gate L1 equals to the control signal GATE at the first input terminal of the logic gate L1. The logic gate L2 has similar operations. In other words, the logic gates L1-L2 can transmit the control signals GATE correctly to their output terminal. It represents that the pixels PX1 and the pixels PX2 can be scanned normally and can be updated by the control signals GATE transmitted from the logic gate L1 and the logic gate L2. Thus, the pixels PX1 and the pixels PX2 display the image data DB of the frame F2.

At the error timing point TP1, the error ER1 occurs and then the enable signal GE changes form the logic value 0 to the logic value 1. Taking the logic gate L3 as an example, when the enable signal GE has the logic value 1, the operation result at the output terminal of the logic gate L3 equals to the enable signal GE with the logic value 1 at the second input terminal of the logic gate L3. such that the logic gate L3 in the logic circuit 144 in the control circuit 140 stops outputting the control signal GATE to the pixels. The logic gate L4 has similar operations. In other words, the logic gates L3-L4 cannot transmit the control signals GATE correctly to their output terminal. It represents that the pixels PX3 and the pixels PX4 cannot be scanned normally and cannot be updated by the control signals GATE transmitted from the logic gate L3 and the logic gate L4. Thus, the pixels PX3 and the pixels PX4 display the image data DA of the previous frame F1.

Therefore, the active area 110 is divided into an update region UR and a retain region RR. The update region UR includes the pixels PX1 and the pixels PX2 and displays the image data DB of the current frame F2 (e.g., (N)th frame). The retain region RR includes the pixels PX3 and the pixels PX4 and displays the image data DA of the previous frame F1 (e.g., (N−1)th frame).

In some related approaches, when an error occurs, a decoder in a display device cannot restore correct data, causing the display device to display a snowflake image (noise image).

Compare to the aforementioned related approaches, in the present disclosure, when the error ER1 or ER2 occurs, the enable signal GE changes from a level to another level such that the corresponding pixels PX are not updated and display the image data of previous frame to prevent the display device from displaying a snowflake image (noise image). Since the difference between the current frame and the previous frame is barely noticeable, the viewers still have comfortable user experience.

Figure 4:
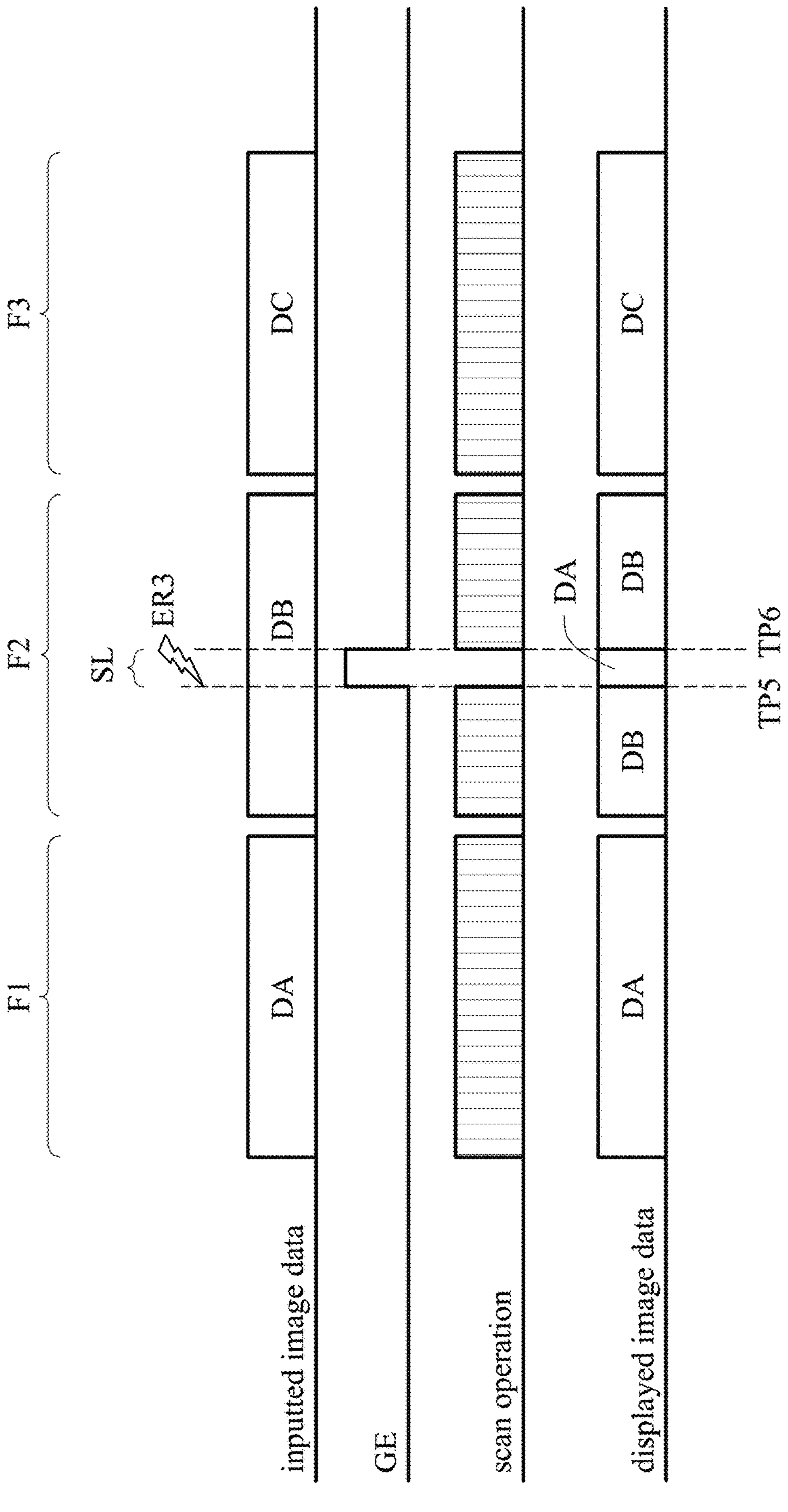
FIG. 4 is an operation diagram of the display device in FIG. 1 according to some embodiments of the present disclosure.

Reference is made to FIG. 4. FIG. 4 is an operation diagram of the display device 100 in FIG. 1 according to some embodiments of the present disclosure.

In some embodiments, a VESA compression technology is applied to the image data DA-DC. One unit of the VESA compression technology is a slice. As illustrated in FIG. 4, an error ER3 occurs at an error timing point TP5 in a slice SL in the frame F2 (e.g., (N)th frame). The enable signal GE has the low level in the frame F1 and changes from the low level to a high level at the error timing point TP5 in the slice SL in the frame F2. Then, the enable signal GE changes from the high level to the low level at an end timing point TP6 of the slice SL in the frame F2. Similar to FIG. 2, the pixels PX corresponding to the enable signal GE with the low level in the frame F2 can be scanned normally, can be updated by the corresponding control signals GATE, and can display the image data DB of the frame F2. On the contrary, the pixels PX corresponding to the enable signal GE with the high level in the frame F2 cannot be scanned normally, cannot be updated by the corresponding control signals GATE, and display the image data DA of the previous frame F1.

Figure 5A:
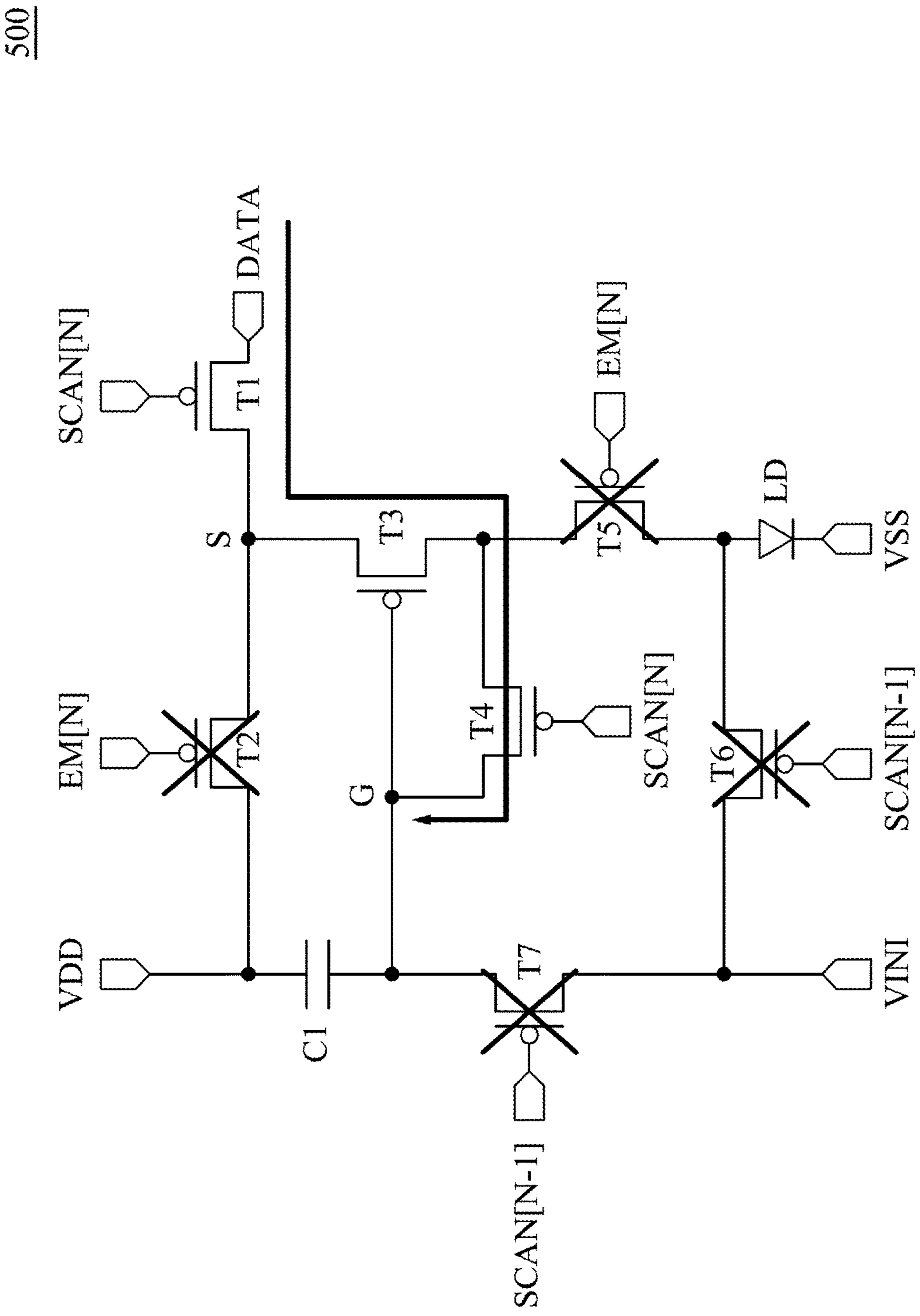
FIG. 5A is a schematic diagram illustrating a sub-pixel circuit in a data writing duration according to some embodiments of the present disclosure.
Figure 5B:
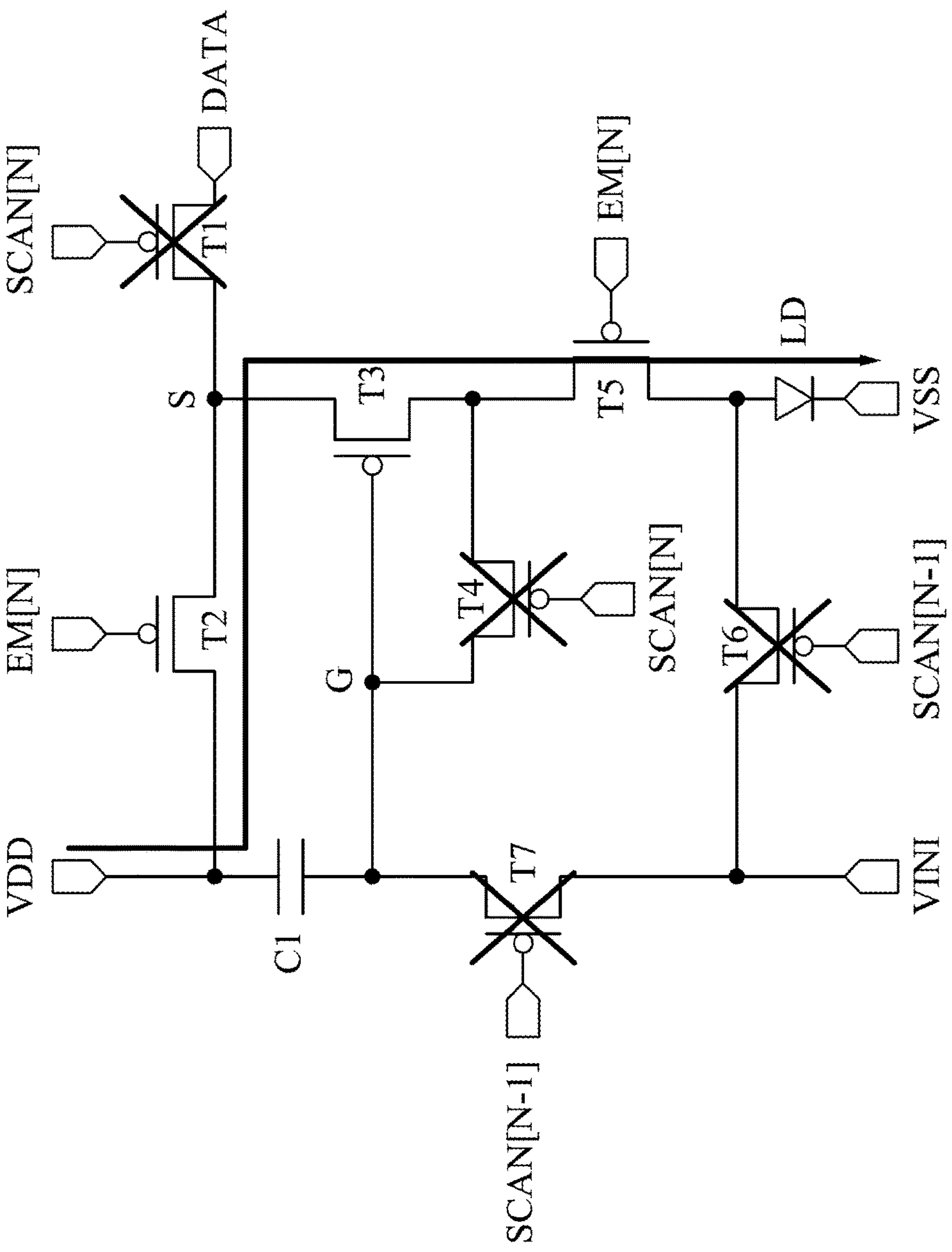
FIG. 5B is a schematic diagram illustrating the sub-pixel circuit in FIG. 5A in a light-emitting duration according to some embodiments of the present disclosure.

References are made to FIG. 5A and FIG. 5B. FIG. 5A is a schematic diagram illustrating a sub-pixel circuit 500 in a data writing duration according to some embodiments of the present disclosure. FIG. 5B is a schematic diagram illustrating the sub-pixel circuit 500 in FIG. 5A in a light-emitting duration according to some embodiments of the present disclosure.

The sub-pixel circuit 500 can be disposed in the red sub-pixel R1, the green sub-pixel G1, or the blue sub-pixel B1 in FIG. 1. As illustrated in FIG. 5A, the sub-pixel circuit 500 includes transistors T1-T7, a capacitor C1, and a light-emitting element LD. In this example, each of the transistors T1-T7 is implemented by a P-type Metal-Oxide-Semiconductor Field-Effect Transistor (MOSFET) and the light-emitting element LD is implemented by an organic light-emitting diode, but the present disclosure is not limited thereto.

A first terminal of the transistor T1 is configured to receive image data DATA. The transistor T1 is controlled by a scan control signal SCAN[N]. A second terminal of the transistor T1 is coupled to a first terminal of the transistor T2. The second terminal of the transistor T2 and a first terminal of the capacitor C1 are configured to receive the power voltage VDD. The transistor T2 is controlled by an emission control signal EM[N]. A first terminal of the transistor T3 is coupled between the transistor T1 and the transistor T2. A control terminal of the transistor T3 is coupled to a second terminal of the capacitor C1. A second terminal of the transistor T3 is coupled to a first terminal of the transistor T4 and a first terminal of the transistor T5. A second terminal of the transistor T4 is coupled to the control terminal of the transistor T3 and the second terminal of the capacitor C1. The transistor T4 is controlled by the scan control signal SCAN[N]. A second terminal of the transistor T5 is coupled to an anode terminal of the light-emitting element LD. The transistor T5 is controlled by the emission control signal EM[N]. A cathode terminal of the light-emitting element LD is configured to receive the power voltage VSS. A first terminal of the transistor T6 is coupled to the anode terminal of the light-emitting element LD. A second terminal of the transistor T6 is configured to receive an initial voltage VINI. The transistor T6 is controlled by a scan control signal SCAN[N−1]. A first terminal of the transistor T7 is configured to receive the initial voltage VINI. A second terminal of the transistor T7 is coupled to the second terminal of the capacitor C1. The transistor T7 is controlled by the scan control signal SCAN[N−1].

It is noted that the implementation of the sub-pixel circuit 500 in FIG. 5A and FIG. 5B is merely for illustration, and the present disclosure is not limited thereto. Other suitable implementations of the sub-pixel circuit 500 are within the contemplated scopes of the present disclosure.

In an initial duration, the initial voltage VINI is transmitted to the control terminal (e.g., a gate terminal G) of the transistor T3, and the power voltage VDD is transmitted to the first terminal (e.g., a source terminal S) of the transistor T3.

As illustrated in FIG. 5A, in the data writing duration, the transistor T1 and the transistor T4 are turned on by the scan control signal SCAN[N], the transistor T2 and the transistor T5 are turned off by the emission control signal EM[N], and the transistor T6 and the transistor T7 are turned off by the scan control signal SCAN[N−1]. Thus, the image data DATA can be transmitted to the gate terminal G of the transistor T3 through the transistor T1, the transistor T3, and the transistor T4, in which the transistor T3 is in a diode-connected form.

As illustrated in FIG. 5B, in the light-emitting duration, the transistor T1 and the transistor T4 are turned off by the scan control signal SCAN[N], the transistor T2 and the transistor T5 are turned on by the emission control signal EM[N], and the transistor T6 and the transistor T7 are turned off by the scan control signal SCAN[N−1]. Thus, an emission current is conducted from the transistor T3 to the light-emitting element LD via the transistor T5.

The scan control signal SCAN[N], the scan control signal SCAN[N−1] in FIG. 5A and FIG. 5B, other start control signals, and other clock signals can be included in the control signals GATE in FIG. 3. In addition, as described in the paragraphs related to FIG. 2, no matter whether the errors ER1-ER2 occurs or not, signals related to emission operate normally. It represents that the emission control signal EM[N] in FIG. 5A and FIG. 5B can operate normally.

As described above, the present disclosure can prevent the display device from displaying the snowflake image (noise image) and maintain comfortable user experience to viewers.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A driver circuit coupled to a control circuit configured to control a plurality of pixels, wherein the driver circuit comprises:

a detector circuit configured to detect whether an error occurs or not; and an outputting circuit configured to output an enable signal to the control circuit, wherein when the error occurs, the enable signal changes from a first level to a second level such that the control circuit stops outputting a plurality of control signals to the plurality of pixels, wherein when the error occurs at an error timing point in a (N)th frame, the enable signal changes from the first level to the second level at the error timing point in the (N)th frame and a plurality of first pixels to be scanned in the (N)th frame after the error timing point are retained to display image data of a (N−1)th frame, and the enable signal changes from the second level to the first level at a start timing point of a (N+1)th frame.

2. The driver circuit of claim 1, wherein the first level is lower than the second level.

3. A driver circuit coupled to a control circuit configured to control a plurality of pixels, wherein the driver circuit comprises:

a detector circuit configured to detect whether an error occurs or not; and an outputting circuit configured to output an enable signal to the control circuit, wherein when the error occurs, the enable signal changes from a first level to a second level such that the control circuit stops outputting a plurality of control signals to the plurality of pixels, wherein when the error occurs at an error timing point in a slice unit of a VESA compression technology in a (N)th frame, the enable signal changes from the first level to the second level at the error timing point in the slice unit of the VESA compression technology in the (N)th frame and changes from the second level to the first level at an end timing point of the slice unit of the VESA compression technology in the (N)th frame.

4. A display device, comprising:

an active area comprising a plurality of pixels;

a control circuit configured to control the plurality of pixels; and a driver circuit configured to detect whether an error occurs or not and output an enable signal to the control circuit, wherein when the error occurs, the enable signal changes from a first level to a second level such that the control circuit stops outputting a plurality of control signals to the plurality of pixels, wherein when the error occurs at an error timing point in a (N)th frame, the enable signal changes from the first level to the second level at the error timing point in the (N)th frame and a plurality of first pixels to be scanned in the (N)th frame after the error timing point are retained to display image data of a (N−1)th frame, and the enable signal changes from the second level to the first level at a start timing point of a (N+1)th frame.

5. The display device of claim 4, wherein the first level is lower than the second level.

6. The display device of claim 4, wherein the active area comprises an update region and a retain region, the update region displays image data of the (N)th frame, and the retain region comprises the plurality of first pixels retained to display the image data of the (N−1)th frame.

7. The display device of claim 4, wherein the control circuit comprises:

a control signal generator circuit configured to generate the plurality of control signals; and a logic circuit configured to receive the plurality of control signals from the control signal generator circuit and the enable signal from the driver circuit, and configured to output the plurality of control signals to the plurality of pixels according to the enable signal.

8. The display device of claim 7, wherein the logic circuit comprises:

a plurality of logic gates, wherein each of the logic gates is configured to perform a logic operation on the enable signal and one of the plurality of control signals.

9. The display device of claim 8, wherein the plurality of logic gates comprise a plurality of OR gates.

10. The display device of claim 4, wherein the driver circuit comprises:

a detector circuit configured to detect whether the error occurs or not.

11. The display device of claim 4, wherein the display device comprises an organic light-emitting diode display panel.

* * * * *